United States Patent
Shiosaka

(10) Patent No.: US 11,772,856 B2
(45) Date of Patent: Oct. 3, 2023

(54) STORAGE CASE

(71) Applicant: SUZUKI MOTOR CORPORATION, Hamamatsu (JP)

(72) Inventor: Taku Shiosaka, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 265 days.

(21) Appl. No.: 17/213,794

(22) Filed: Mar. 26, 2021

(65) Prior Publication Data

US 2021/0300638 A1    Sep. 30, 2021

(30) Foreign Application Priority Data

Mar. 27, 2020  (JP) ................. 2020-058063

(51) Int. Cl.
*B65D 43/22* (2006.01)
*B65D 43/16* (2006.01)
*B62J 9/00* (2020.01)

(52) U.S. Cl.
CPC .......... *B65D 43/22* (2013.01); *B65D 43/163* (2013.01); *B62J 9/00* (2013.01)

(58) Field of Classification Search
CPC .......... B65D 43/22; B65D 43/163; B62J 9/00; B62J 9/30; B62J 9/24; Y10S 292/11; Y10S 292/63; Y10T 292/0911; Y10T 292/1043; Y10T 292/1075; Y10T 292/1089; E05C 3/00; E05C 3/006; E05C 3/008; E05C 3/02; E05C 3/04; E05C 3/047; E05C 3/048; E05C 5/00; E05C 2005/005; E05C 19/10; E05C 19/12; E05C 19/14; E05C 19/145; E05B 5/00; E05B 5/006; E05B 7/00; E05B 13/002; E05B 13/004; E05B 65/52;
(Continued)

(56) References Cited

U.S. PATENT DOCUMENTS

2001/0030215 A1    10/2001    Vincenzo

FOREIGN PATENT DOCUMENTS

DE    4230972 A1  *  5/1993    ............. A45C 13/28
EP    1069035 A1  *  1/2001    ................ B62J 9/00
(Continued)

OTHER PUBLICATIONS

Office Action issued in Indian Application No. 202114013619 dated Feb. 4, 2022.

*Primary Examiner* — James N Smalley
(74) *Attorney, Agent, or Firm* — TROUTMAN PEPPER HAMILTON SANDERS LLP

(57) ABSTRACT

A storage case where a case cover is openably and closably connected to a case body, the storage case includes a latch mechanism fixing the case cover to the case body, a handle swingably connected to a plane to which the latch mechanism is connected, a locking mechanism configured to lock the latch mechanism and the handle simultaneously, and a fixing mechanism fixing a hooked state to a locking portion of an attachment target. The fixing mechanism includes a movable member that is movable to an attachment/detachment position where the storage case is attachable and detachable and a fixed position where the storage case is not attachable or detachable. The movable member can be positioned at the fixed position by the latch mechanism or the handle. The locking mechanism can lock in a state in which the movable member is positioned at the fixed position.

5 Claims, 10 Drawing Sheets

(58) Field of Classification Search
CPC ............... E05B 65/5246; E05B 65/523; E05B 65/5269; E05B 65/5276
See application file for complete search history.

(56) References Cited

FOREIGN PATENT DOCUMENTS

| | | | | |
|---|---|---|---|---|
| EP | 2 586 687 | A2 | 5/2013 | |
| EP | 3696062 | A1 * | 8/2020 | ............. B62H 5/001 |
| JP | 2013-95227 | A | 5/2013 | |
| KR | 2004046301 | A * | 10/2009 | ............. E05B 65/52 |
| WO | WO-2007131941 | A1 * | 11/2007 | ......... A45C 13/1084 |
| WO | WO-2009101470 | A1 * | 8/2009 | ................ B62J 9/00 |

\* cited by examiner

STORAGE CASE

CROSS-REFERENCE TO RELATED APPLICATION

This application is based on Japanese Patent Application No. 2020-058063 filed on Mar. 27, 2020, the contents of which are incorporated herein by way of reference.

FIELD OF INVENTION

The present invention relates to a storage case.

BACKGROUND

A storage case whose closed state is maintained by a so-called draw latch mechanism is known (for example, see JP-A-2013-095227). In the storage case described in JP-A-2013-095227, a case cover is openably and closably connected to a case body, and a storage space is formed by the case body and the case cover. A pair of hanging fittings are provided on a front surface of the case body, a pair of receiving fittings are provided on a front surface of the case cover, and the storage case is locked in a state in which the case cover is closed by pushing down a lock lever of the hanging fittings while the hanging fittings are hooked to the receiving fittings.

SUMMARY OF INVENTION

In addition to a locking mechanism that performs locking in the closed state of the storage case, the storage case described in JP-A-2013-095227 is provided with a locking mechanism that performs locking in a state in which the storage case is attached to an attachment target. For this reason, it is necessary to perform a locking operation when closing the storage case and when attaching the storage case to the attachment target, which is a troublesome work for a user.

The present invention has been made in view of the above circumstances, and an object thereof is to provide a storage case capable of improving the operability of a locking operation and reducing a workload of a user.

A storage case according to an aspect of the present disclosure, the storage case in which a case cover is openably and closably connected to a case body, the storage case includes a latch mechanism configured to fix the case cover to the case body, a handle swingably connected to a plane to which the latch mechanism is connected, a locking mechanism configured to lock the latch mechanism and the handle simultaneously, and a fixing mechanism configured to fix a hooked state of a storage case to a locking portion of an attachment target, in which the fixing mechanism includes a movable member that is movable to an attachment/detachment position where the storage case is attachable and detachable and a fixed position where the storage case is not attachable or detachable, the movable member is capable of being positioned at the fixed position by the latch mechanism or the handle, and the locking mechanism is capable of performing locking in a state in which the movable member is positioned at the fixed position, so that the above problem is solved.

DETAILED DESCRIPTION

In a storage case of one aspect of the present invention, a case cover is openably and closably connected to a case body. The case body is provided with a latch mechanism for fixing the case cover, and in the case body, a handle is swingably connected to same plane to which the latch mechanism is connected. The locking mechanism locks the latch mechanism and the handle simultaneously, and the fixing mechanism fixes a hooked state of a storage case to a locking portion of an attachment target. A movable member of the fixing mechanism is moved to an attachment/detachment position where the storage case is attachable and detachable and a fixed position where the storage case is not attachable or detachable. The movable member is positioned at the fixed position by the latch mechanism or the handle. By locking the latch mechanism and the handle, the fixing mechanism is indirectly locked via the latch mechanism or the handle. Therefore, locking is performed in the closed state of the storage case, and locking is performed in the state in which the storage case is fixed to the attachment target, so that the operability of a locking operation is improved and a workload of a user is reduced. Further, since locking can be performed when the movable member is at the fixed position, the fixing mechanism is not accidentally locked while the storage case is attachable and detachable.

Figure 1:
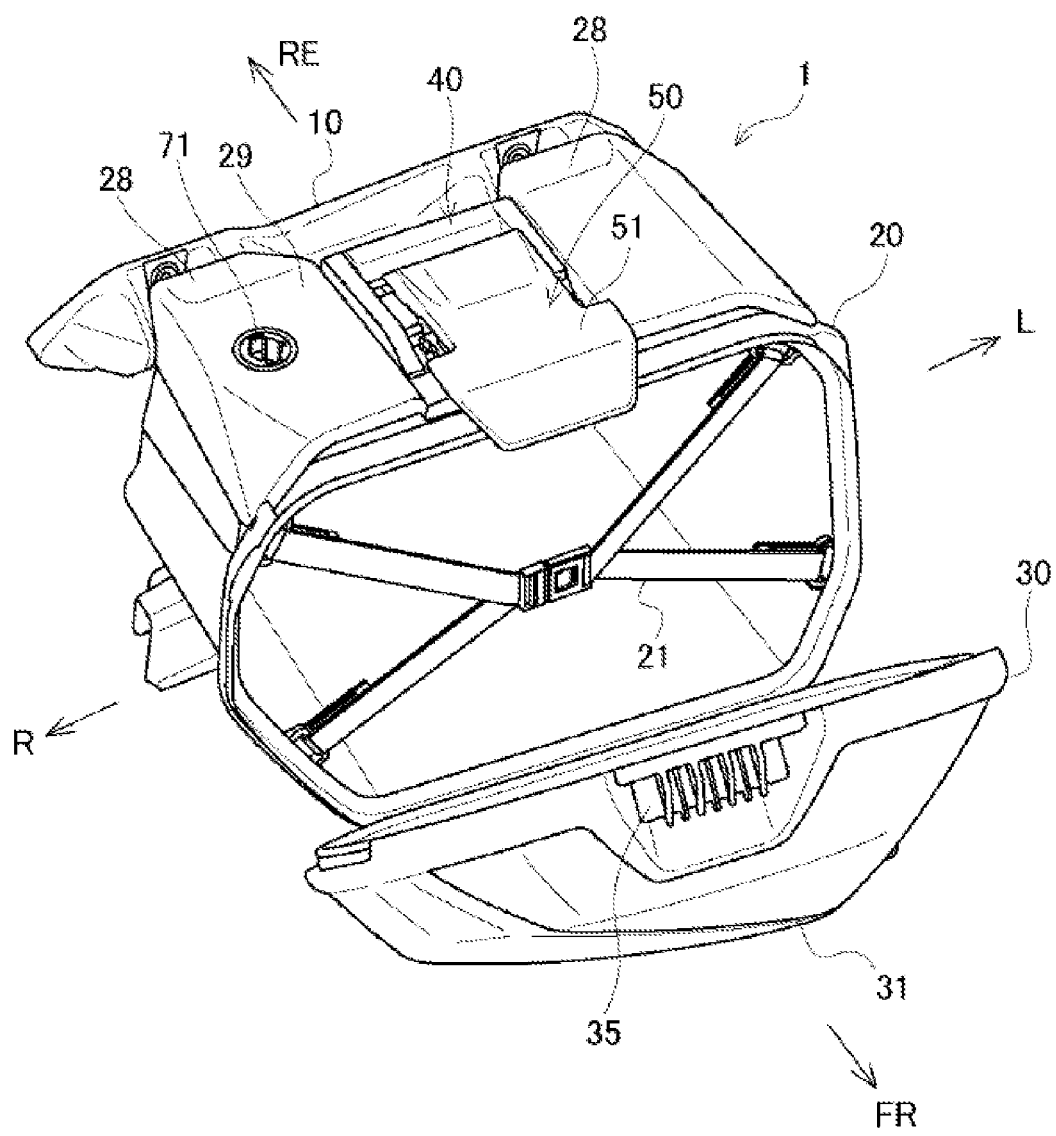
FIG. 1 is a perspective view of a storage case according to the present embodiment.

Hereinafter, the present embodiment will be described in detail with reference to the accompanying drawings. In the following description, a storage case, as a side case, that is attached to a vehicle such as a saddle-type vehicle will be described. However, the storage case of the present embodiment can be applied to other storage cases such as a rear box on a loading platform, a trunk case with casters, and a baggage bag. In the following figures, an arrow FR indicates a case front side, an arrow RE indicates a case rear side, an arrow L indicates a case left side, and an arrow R indicates a case right side. FIG. 1 is a perspective view of the storage case according to the present embodiment.

As illustrated in FIG. 1, a storage case 1 is detachably attached to a case holder 10 on a side portion of the vehicle. A front surface of a case body 20 of the storage case 1 is open, and the case cover 30 is connected to a lower edge of the case body 20 so as to be openable downward via a hinge. A baggage storage space is formed by the case body 20 and the case cover 30, and the case body 20 is provided with an X-shaped inner band 21 for holding the baggage stored in the storage space. Hemispherical elastic legs (not illustrated) are provided at four corners of a bottom surface of the storage case 1, so that the storage case 1 can stand by itself in a stable state even when the storage case 1 is removed from the vehicle.

A handle 40 that makes the storage case 1 portable is swingably connected to the center of an upper surface of the case body 20. A latch mechanism 50 for fixing the case cover 30 to the case body 20 while the case cover 30 is closed is installed inside the handle 40. Further, an upper cover 29 is attached to the upper surface of the case body 20 so as to surround the handle 40 and the latch mechanism 50. A key cylinder 71 of the locking mechanism 70 (see FIG. 6) is exposed from the upper cover 29, and the latch mechanism 50 and the handle 40 can be locked and unlocked by a key inserted into a keyhole of the key cylinder 71.

Further, the storage case 1 is provided with a fixing mechanism 80 (see FIG. 8) for fixing a state in which the storage case 1 is attached to the case holder 10. Therefore, in addition to the locking mechanism 70 for the handle 40 and the latch mechanism 50, a locking mechanism for the fixing mechanism 80 is necessary, and the number of components increases. In order to lock the handle 40, the latch mechanism 50, and the fixing mechanism 80 by a single locking mechanism 70, the locking structure is complicated. Therefore, in the storage case 1 of the present embodiment, the handle 40 can be locked by the locking mechanism 70 only when the movement of the fixing mechanism 80 is restricted by the handle 40.

Figure 2:
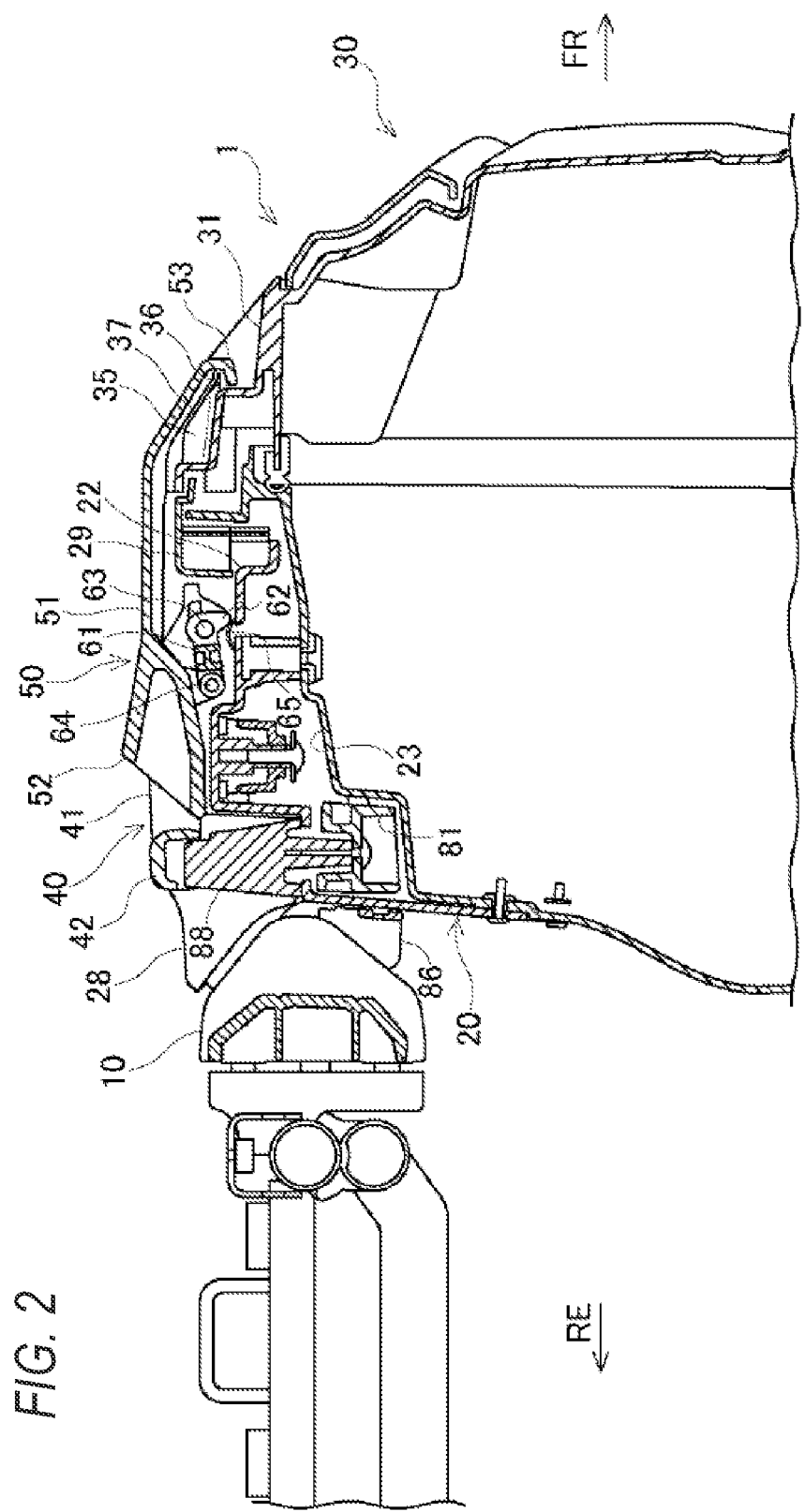
FIG. 2 is a partial cross-sectional view of the storage case according to the present embodiment.
Figure 3:
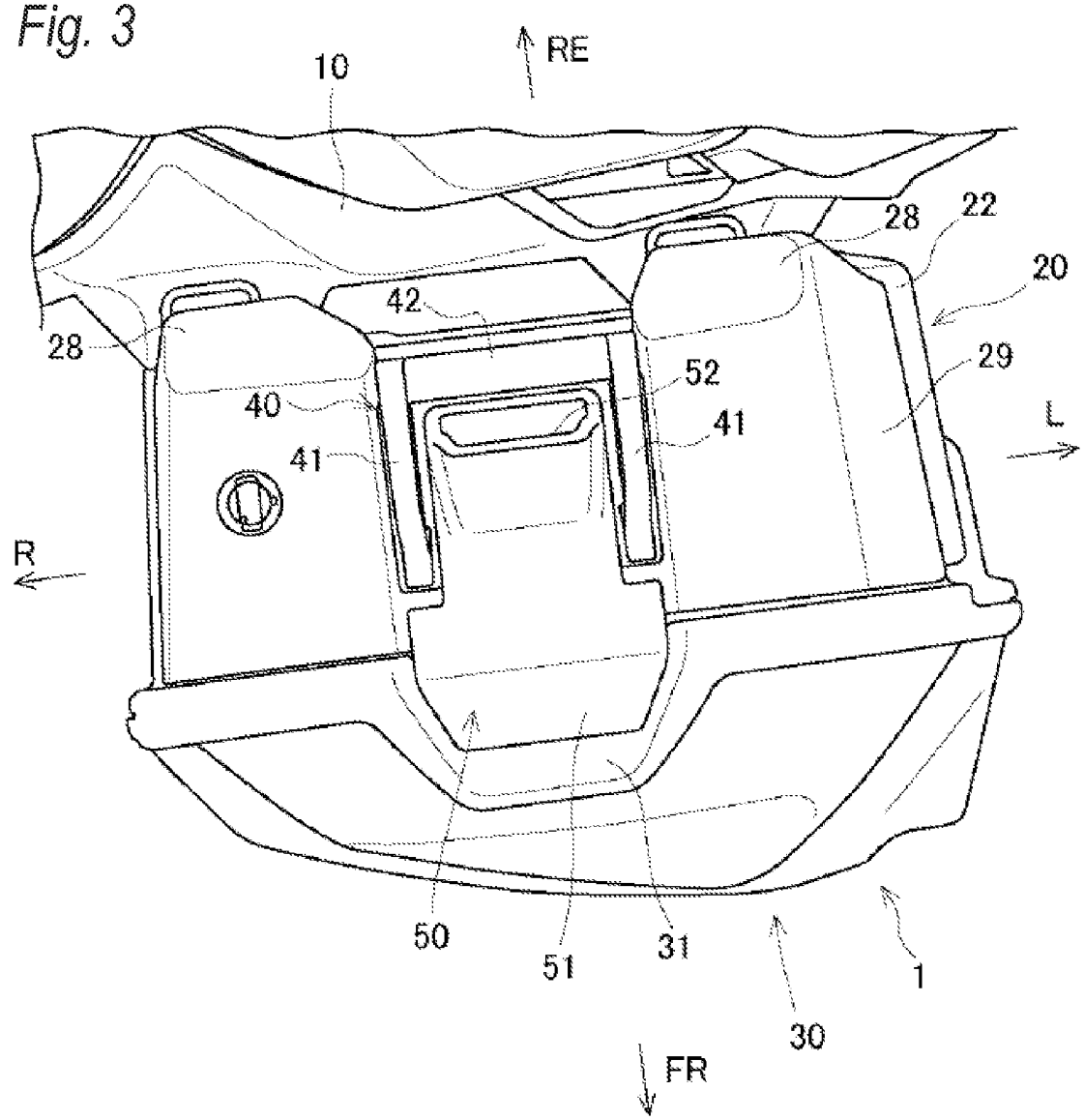
FIG. 3 is a plan view of the storage case according to the present embodiment.
Figure 4:
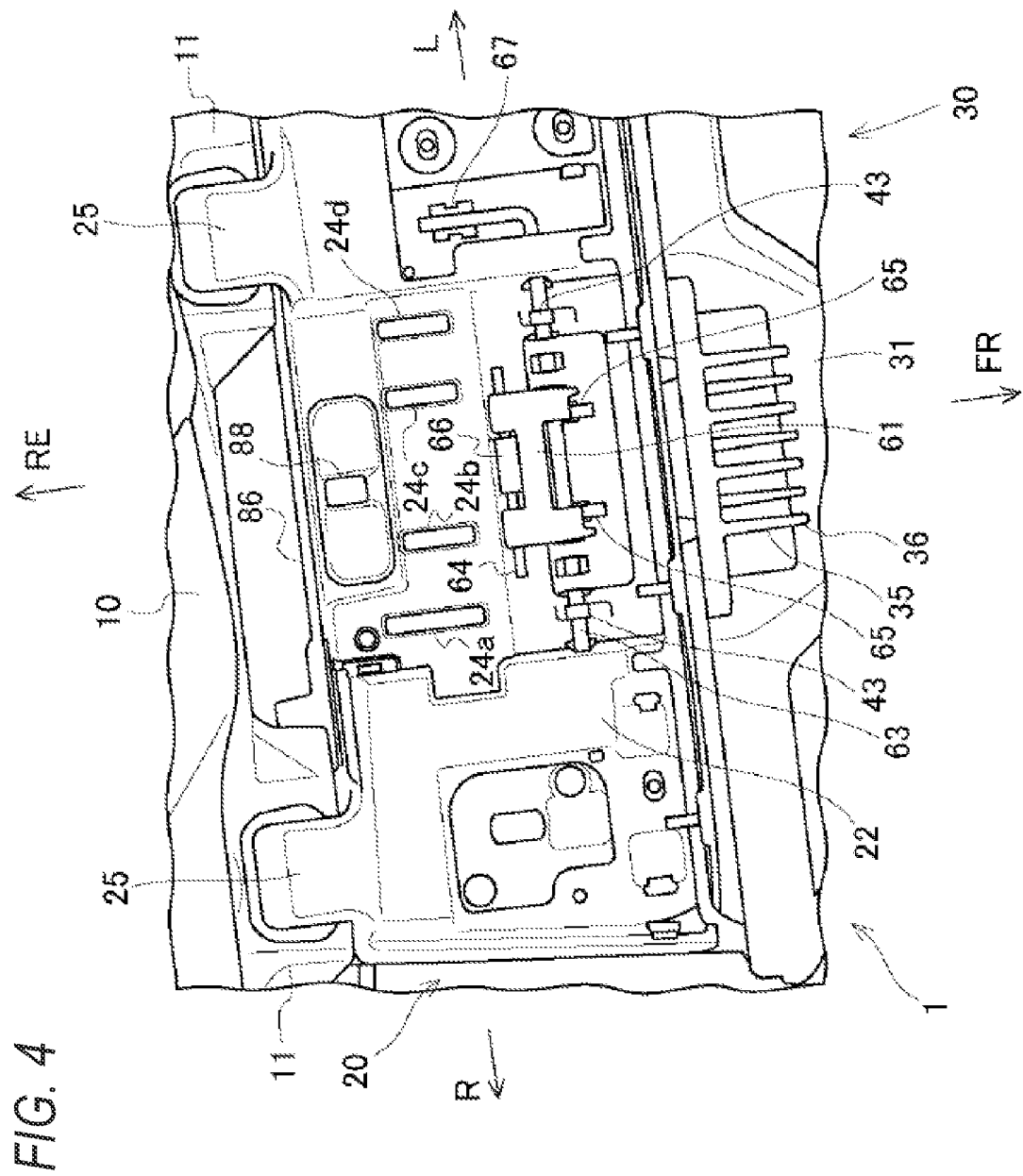
FIG. 4 is a partial plan view of the storage case according to the present embodiment.
Figure 5:
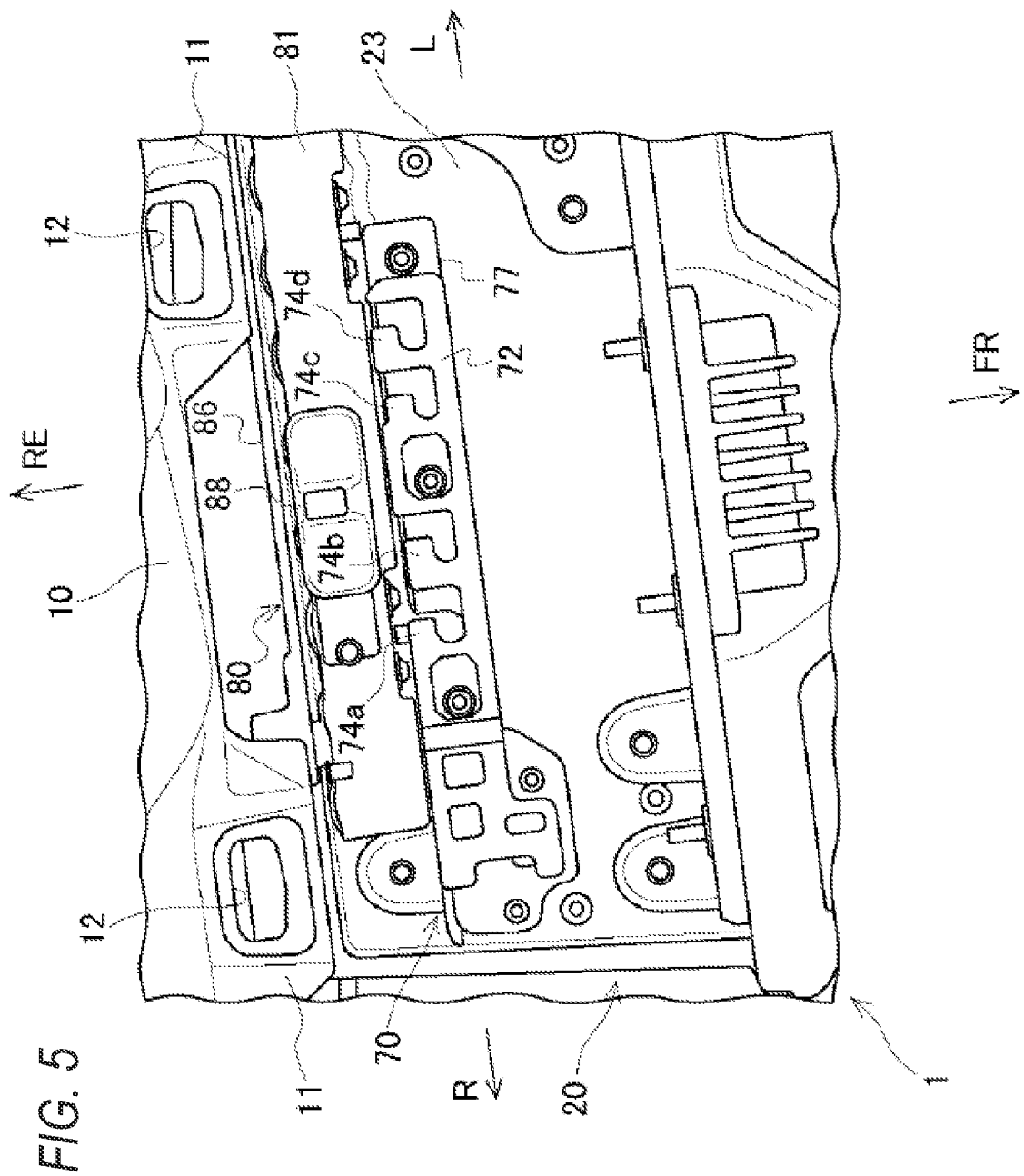
FIG. 5 is a partial plan view of the storage case according to the present embodiment.
Figure 6:
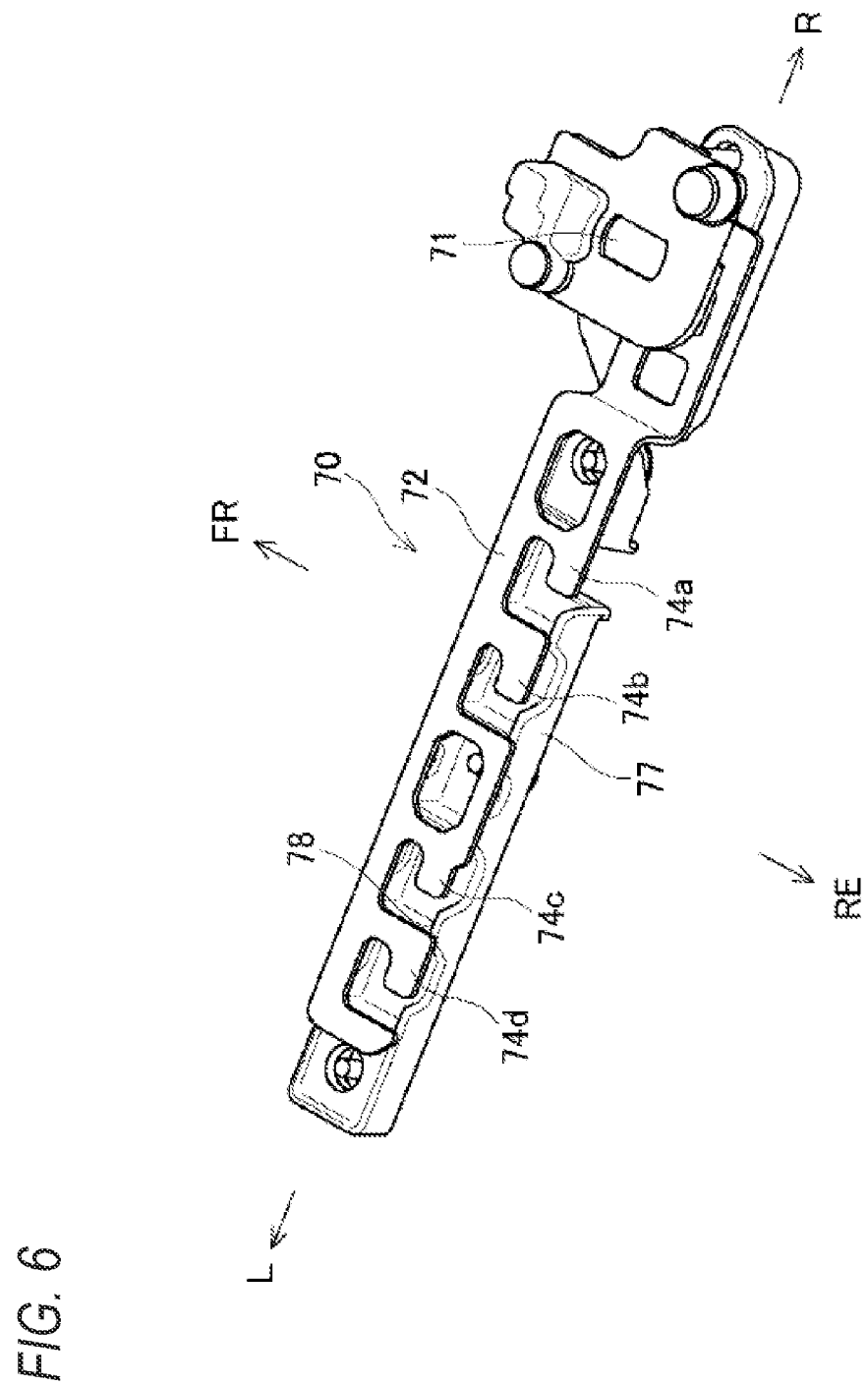
FIG. 6 is a perspective view of a locking mechanism according to the present embodiment.
Figure 7:
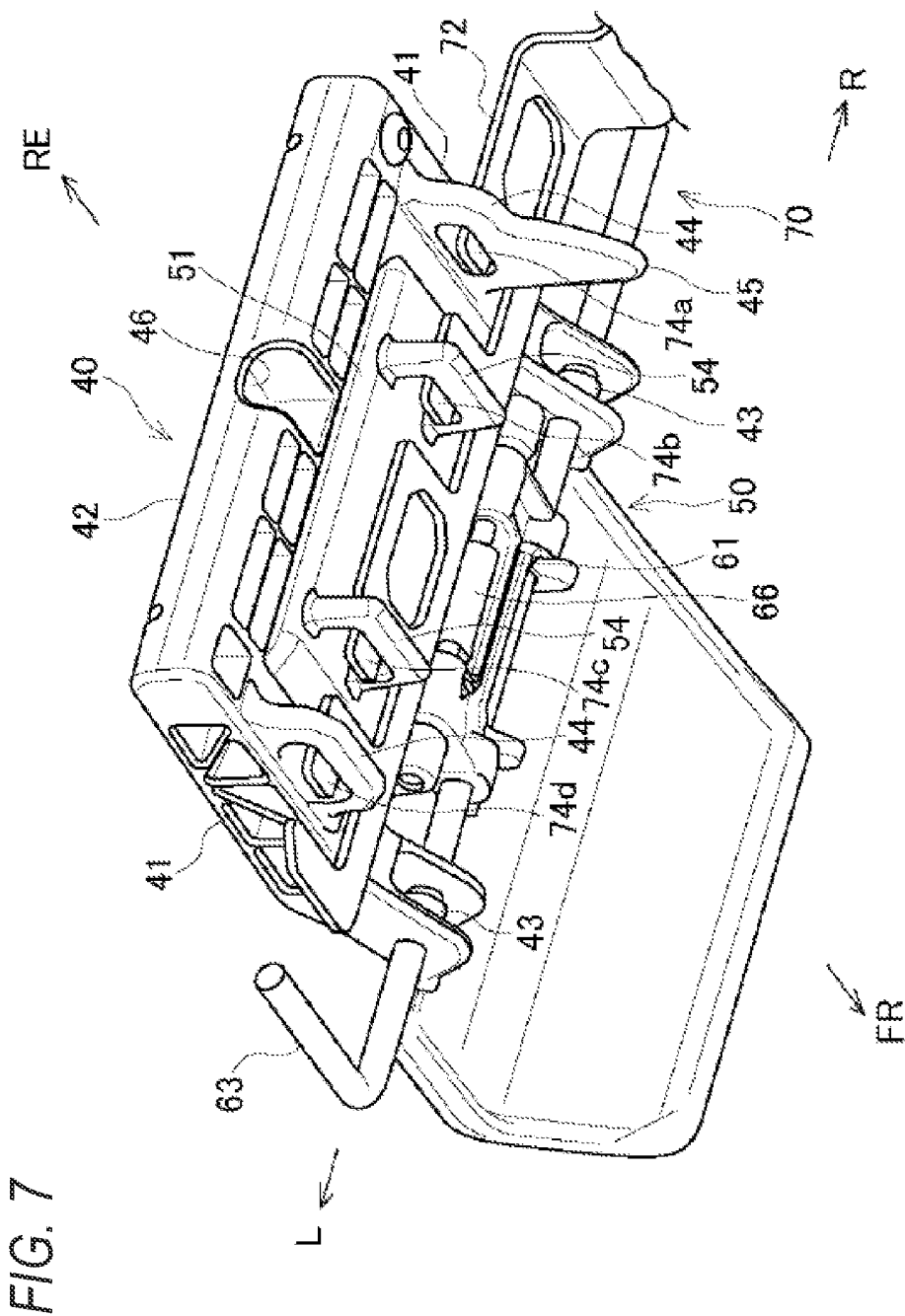
FIG. 7 is a perspective view illustrating a locked state according to the present embodiment.

An upper structure of the storage case will be described with reference to FIGS. 2 to 7. FIG. 2 is a partial cross-sectional view of the storage case according to the present embodiment. FIG. 3 is a plan view of the storage case according to the present embodiment. FIG. 4 is a partial plan view of the storage case according to the present embodiment. FIG. 5 is a partial plan view of the storage case according to the present embodiment. FIG. 6 is a perspective view of the locking mechanism according to the present embodiment. FIG. 7 is a perspective view illustrating a locked state according to the present embodiment. Incidentally, FIG. 4 illustrates a state in which the upper cover, a latch arm, and the handle are removed from the storage case, and FIG. 5 illustrates a state in which an installation cover is further removed.

As illustrated in FIGS. 2 to 4, an upper portion of the case body 20 is formed by an installation cover 22 on which various mechanisms are installed. The upper cover 29 is attached to an upper portion of the installation cover 22 so as to expose the center of an upper surface thereof, and the latch mechanism 50 and the handle 40 are installed in the exposed portion of the installation cover 22 (in particular, see FIG. 3). The latch arm 51 is provided on the upper portion of the installation cover 22 as a hooking fitting of the latch mechanism 50, and an arm receiving portion 35 including a plurality of plate-shaped protrusions is provided on an upper portion of the case cover 30 as receiving fitting of the latch mechanism 50. The latch arm 51 is connected to the installation cover 22 via a connecting arm 61.

The connecting arm 61 is formed in an H shape in a plan view in which a pair of left and right arm portions are included (particularly, see FIG. 4). A base end side of the connecting arm 61 is connected to the installation cover 22 via a first swinging pin 63, and a tip side of the connecting arm 61 is connected to the latch arm 51 via a second swinging pin 64. A cam 62 (particularly, see FIG. 2) is formed on the base end side of the connecting arm 61, and repulsion springs 65 each having an arch shape in a side view that repels the swing of the connecting arm 61 are installed on the installation cover 22. When the connecting arm 61 swings about the first swinging pin 63 and the cam 62 is in elastic contact with the repulsion springs 65, the connecting arm 61 is held in a standing posture in which the latch arm 51 is pushed up and a lying posture in which the latch arm 51 is pulled down.

The latch arm 51 is formed in a wide plate shape extending from the tip side of the connecting arm 61 toward the case cover 30. A cylindrical gripping portion 52 is formed on a base end side of the latch arm 51, and the latch arm 51 is lifted by the gripping portion 52. Further, the base end side of the latch arm 51 is pushed in a pushing-up direction (opening direction) by a torsion spring 66 (in particular, see FIG. 4) mounted on the second swinging pin 64. A hook 53 bent in a C shape in the side view is formed on a tip side of the latch arm 51. When the hook 53 is hooked to a tip of the arm receiving portion 35, the case cover 30 is locked to the case body 20 in the closed state.

A recessed portion 31 is formed in the upper portion of the case cover 30 such that the hook 53 of the latch arm 51 enters, and a bottom surface of the recessed portion 31 is formed in a stepped shape having two upper and lower stages. In the upper stage of the recessed portion 31, the arm receiving portion 35 having a comb shape in the plan view are provided in a case width direction (a left-right direction). A locking claw 36 protruding forward from the upper stage of the recessed portion 31 is formed on the tip side of the arm receiving portion 35. An inclined surface 37 (particularly, see FIG. 2) for guiding the hook 53 of the latch arm 51 toward a claw tip of the locking claw 36 is formed on an upper surface of the arm receiving portion 35. When the hook 53 abuts on the inclined surface 37, the hook 53 is guided to a locking position at which the hook 53 is hooked to the locking claw 36.

The inclined surface 37 of the arm receiving portion 35 is formed in a range from a predetermined position on the base end side to the claw tip of the locking claw 36. In the present embodiment, the inclined surface 37 is formed horizontally from a base end to a substantially intermediate position of the arm receiving portion 35, and is inclined such that the thickness of the arm receiving portion 35 decreases from the substantially intermediate position to the claw tip. The arm receiving portion 35 is formed in an elongated shape in the plan view and facilitates resin molding. The inclined surface 37 may be inclined linearly as in the present embodiment, may be inclined while being curved in a convex shape, or may be inclined while being curved in a concave shape.

The handle 40 is formed in a U shape in the plan view by a pair of support arms 41 that swing about the first swinging pin 63 and a grip 42 that connects the pair of support arms 41. The handle 40 is swingably connected to the same installation cover 22 to which the latch arm 51 is connected, and the base end side of the latch arm 51 is accommodated inside the U-shaped handle 40 in the plan view when the handle 40 is downed. Accordingly, the handle 40 and the latch arm 51 are compactly installed in an installation space on the installation cover 22. Base end sides of the pair of support arms 41 are pushed in a retracting direction (closing direction) by a pair of torsion springs 43 (in particular, see FIG. 4) mounted on the first swinging pin 63.

The first swinging pin 63 extends in the case width direction, and the connecting arm 61 is supported on an inner side in the case width direction of the first swinging pin 63, and the handle 40 is supported on an outer side in the case width direction of the first swinging pin 63. Since the first swinging pin 63 is used for both the connecting arm 61 and the handle 40, the number of components and the cost are reduced, and the latch mechanism 50 and the handle 40 are installed more compactly. Further, one end of the first swinging pin 63 is bent in an L shape, and a tip of the bent portion is restricted from rotating by a holding portion 67 on the installation cover 22. The holding portion 67 suppresses the rotation of the first swinging pin 63 and prevents the handle 40 and the latch arm 51 from rotating together.

As illustrated in FIGS. 5 to 7, the locking mechanism 70 for locking the latch mechanism 50 and the handle 40 simultaneously is provided on a case portion 23 below the installation cover 22. The locking mechanism 70 slides a lock plate 72 connected to the key cylinder 71 in the case width direction (left-right direction) with respect to a plate support portion 77 fixed to the case body 20 (the case portion 23). The plate support portion 77 is formed in a box shape of which an upper surface is open and the case width direction is set as a long side. Convex portions 78 (particularly, see FIG. 6) are formed on a side wall of the plate support portion 77 so as to be in point contact or line contact with the lock plate 72 and suppress a sliding resistance with respect to the lock plate 72.

The lock plate 72 is formed in a strip shape extending in the case width direction. Four locking pieces 74a to 74d that hook the lock plate 72 and the handle 40 are formed on the lock plate 72. The pair of locking pieces 74b, 74c hook the latch arm 51 on the inner side in the case width direction, and the pair of locking pieces 74a, 74d hook the handle 40 on the outer side in the case width direction. A pair of latch receiving portions 54 hooked to the pair of locking pieces 74b, 74c are formed on the latch arm 51, and a pair of handle receiving portions 44 hooked to the pair of locking pieces 74a, 74d are formed on the handle 40.

Openings which the pair of locking pieces 74b, 74c enter are formed in the pair of latch receiving portions 54, and openings which the pair of locking pieces 74a, 74d enter are formed in the pair of handle receiving portions 44. Four slits 24a to 24d (see FIG. 4) are formed in the installation cover 22 so as to correspond to the pair of latch receiving portions 54 and the pair of handle receiving portions 44. The pair of latch receiving portions 54 protrude to the lower side of the installation cover 22 through the slits 24b, 24c on the inner side in the case width direction, and the pair of handle receiving portions 44 protrude to the lower side of the installation cover 22 through the slits 24a, 24d on the outer side in the case width direction.

The lock plate 72 is slid on the plate support portion 77 by an operation of the key inserted into the key cylinder 71 (see FIG. 6). When the lock plate 72 is slid to a left side, the locking pieces 74a to 74d enter the openings of the pair of latch receiving portions 54 and the pair of handle receiving portions 44. Tips of the four locking pieces 74a to 74d pass through the slits 24a to 24d and face an inner side surface of the installation cover 22 (not illustrated). Accordingly, the latch mechanism 50 and the handle 40 are locked. When the lock plate 72 is slid to a right side, the locking pieces 74a to 74d come off the openings of the pair of latch receiving portions 54 and the pair of handle receiving portions 44 to unlock the latch mechanism 50 and the handle 40. A protruding portion 45 for preventing erroneous locking is provided at a lower portion of one handle receiving portion 44 such that the handle 40 does not descend in the locked state.

At this time, since the latch receiving portions 54 and the handle receiving portions 44 are arranged in the case width direction, the latch receiving portions 54 and the handle receiving portions 44 are simultaneously hooked by the single lock plate 72 that is long in the case width direction. When the lock plate 72 is slid in the case width direction, the latch mechanism 50 and the handle 40 are simultaneously locked and unlocked by the lock plate 72. Therefore, the locking mechanism 70 is also used for both the latch mechanism 50 and the handle 40, and the number of components of the locking mechanism 70 is reduced. Further, since the latch receiving portion 54 and the handle receiving portion 44 are close to each other, the lock plate 72 is formed short to improve the durability of the locking mechanism 70.

As described above, the storage case 1 is attached to the vehicle via the case holder 10. A pair of locking portions 11 (in particular, see FIG. 5) protrude from a front surface of the case holder 10, and locking holes 12 are formed in the respective locking portions 11. A pair of fixing hooks 25 (see FIG. 4) protrude from a rear surface of the installation cover 22, and a tip side of each fixing hook 25 is bent downward. Since the tip sides of the pair of fixing hooks 25 of the installation cover 22 enter the pair of locking holes 12 of the case holder 10, the storage case 1 is detachably hooked to the case holder 10 at two places spaced apart from each other in the case width direction. An eaves portion 28 (see FIG. 2) is formed in the storage case 1 and covers a portion to be hooked to the locking portion 11 to improve design.

Further, a fixing mechanism 80 that fixes a hooked state with respect to the case holder 10 is provided on the case portion 23 below the installation cover 22 (see FIG. 4). The fixing mechanism 80 includes a slider (movable member) 81 stored inside the case body 20 and a slide hook (hook member) 86 sliding integrally with the slider 81 outside the case body 20. The slider 81 is formed in a prismatic shape having a long side in the case width direction, and is stored so as to be slidable in the case width direction by a wall surface of the case body 20. A knob portion 88 having a convex shape in the side view is provided on an upper surface of the slider 81, and is exposed from an upper surface of the installation cover 22 (see FIG. 4).

The slider 81 is slid by the operation of the knob portion 88, and the slide hook 86 on a rear surface of the case body 20 is slid. When the slider 81 is slid to the left side, the slide hook 86 is spaced apart from the pair of locking portions 11. The hooked state of the storage case 1 is released by the slide hook 86, and the storage case 1 is detachably hooked to the case holder 10. When the slider 81 is slid to the right side, the slide hook 86 abuts on the pair of locking portions 11. The hooked state of the storage case 1 is fixed by the slide hook 86, and the storage case 1 is undetachably hooked to the case holder 10.

In this way, the slider 81 is slid between an attachment/detachment position where the storage case 1 is attachable and detachable and a fixed position where the storage case 1 is not attachable or detachable. A recess 46 for positioning the slider 81 in the fixed position is formed in the grip 42 of the handle 40 (see FIG. 7). In this case, the knob portion 88 is positioned directly below the grip 42 when the handle 40 is downed, and the recess 46 of the grip 42 corresponds to the knob portion 88 when the slider 81 is positioned at the fixed position. When a tip of the knob portion 88 enters the recess 46, the slider 81 is positioned at the fixed position, and the slider 81 is held at the fixed position by the handle 40.

When the slider 81 is not positioned at the fixed position, the knob portion 88 interferes with the grip 42, so that the handle 40 cannot be completely downed. The pair of handle receiving portions 44 enter the slits 24a, 24d (see FIG. 4) of the installation cover 22 halfway, and hinder the sliding of the lock plate 72 of the locking mechanism 70. In this way, the locking mechanism 70 can lock the handle 40 and the latch mechanism 50 only when the slider 81 is positioned at the fixed position. Therefore, the handle 40 and the latch mechanism 50 are not locked in a state in which the storage case 1 is attachable to and detachable from the case holder 10.

On the other hand, when the slider 81 is positioned at the fixed position, the knob portion 88 enters the recess 46 of the handle 40, and the handle 40 is completely downed. Therefore, the sliding of the lock plate 72 of the locking mechanism 70 is not hindered by the pair of handle receiving portions 44. When the latch mechanism 50 and the handle 40 are locked by the locking mechanism 70, the slider 81 is fixed to the fixed position by the handle 40, so that the storage case 1 is not attachable or detachable from the case holder 10. Accordingly, with the locking operation of the latch mechanism 50 and the handle 40, the fixing mechanism 80 is also locked by the handle 40 locked by the locking mechanism 70.

Figure 8:
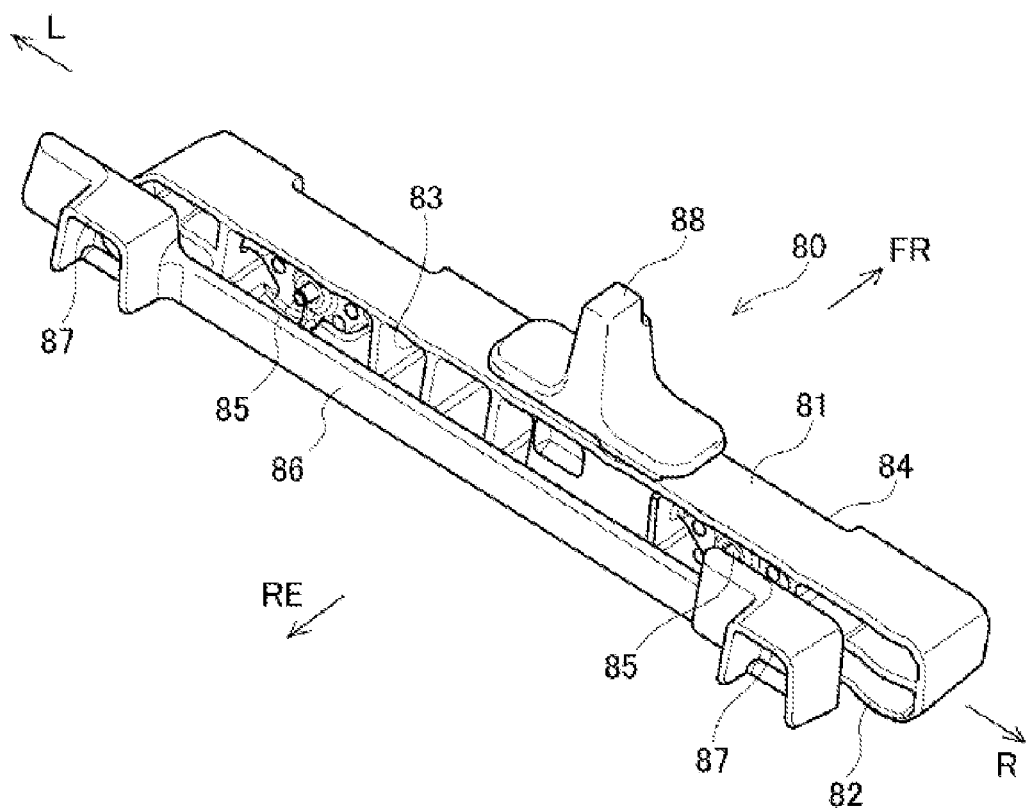
FIG. 8 is a perspective view of a fixing mechanism according to the present embodiment.

Here, details of the fixing mechanism will be described with reference to FIG. 8. FIG. 8 is a perspective view of the fixing mechanism according to the present embodiment.

As illustrated in FIG. 8, the slider 81 of the fixing mechanism 80 is formed in a prismatic shape in the plan view so as to ensure sufficient rigidity. The slide hook 86 is fixed to a rear surface of the slider 81, and the knob portion 88 is fixed to the upper surface of the slider 81. The slider 81 is pressed by each wall surface of the case body 20 (see FIG. 5). Therefore, the slider 81 can be slid by using the knob portion 88 while receiving an appropriate frictional force. A modest braking force may be applied to the slider 81 by an elastic force of the wall surface of the case body 20, and a modest braking force may be applied to the slider 81 by an elastic member (not illustrated).

A lower surface 82 of the slider 81 is formed in a wave shape in a rear view. Therefore, a contact area between the lower surface 82 of the slider 81 and a support surface of the case body 20 in contact with the lower surface 82 is suppressed, and sliding resistance of the slider 81 is reduced. A rear surface 83 of the slider 81 is open, but an outer edge of the rear surface 83 is formed in a wave shape in the plan view (particularly, see FIG. 10B). Therefore, a contact area between the rear surface 83 of the slider 81 and an inner side surface of the case body 20 in contact with the rear surface 83 is suppressed, and the sliding resistance of the slider 81 is reduced. The lower surface 82 and the rear surface 83 of the slider 81 may have a shape capable of reducing the sliding resistance of the slider 81.

The slider 81 is provided with a pair of positioning protrusions 85, and the pair of positioning protrusions 85 slightly protrude from a front surface 84 of the slider 81. A pair of positioning recessed portions 31a (see FIG. 10B) and a pair of positioning recessed portions 31b (see FIG. 10B) are formed on a facing surface of the case body 20 facing the front surface 84 of the slider 81. When the pair of positioning protrusions 85 of the slider 81 fit into the pair of positioning recessed portions 31a, the slider 81 is positioned at an attachment/detachment position where the storage case 1 is attachable and detachable. When the pair of positioning protrusions 85 of the slider 81 fit into the pair of positioning recessed portions 31b, the slider 81 is positioned at a fixed position where the storage case 1 is not attachable or detachable.

The slide hook 86 is formed with a pair of support portions 87 separated in the case width direction. The slide hook 86 is fixed to the slider 81 in the pair of support portions 87, and a load acting on the pair of support portions 87 is received by the slider 81 having high rigidity. The knob portion 88 is formed in a convex shape so as to be easily held and moved by the user. As described above, when the slider 81 is positioned at the fixed position, the tip of the knob portion 88 enters the recess 46 of the grip 42 (see FIG. 10C). Accordingly, the fixing mechanism 80 is formed to be indirectly lockable via the handle 40.

Figure 9A:
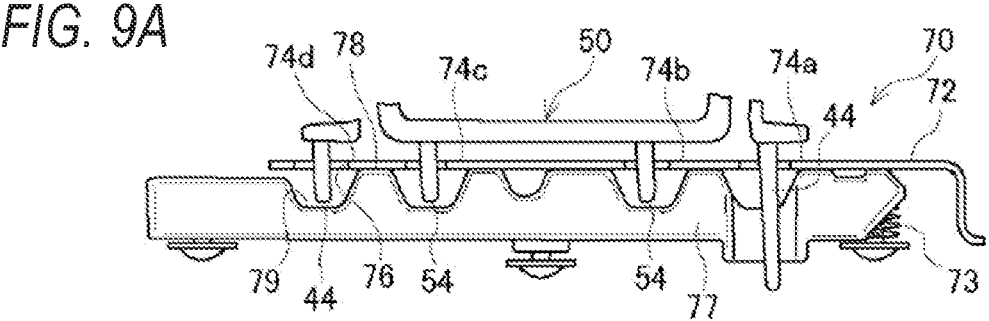
FIGS. 9A to 9D are transition diagrams of a locking operation of the locking mechanism according to the present embodiment.
Figure 9B:
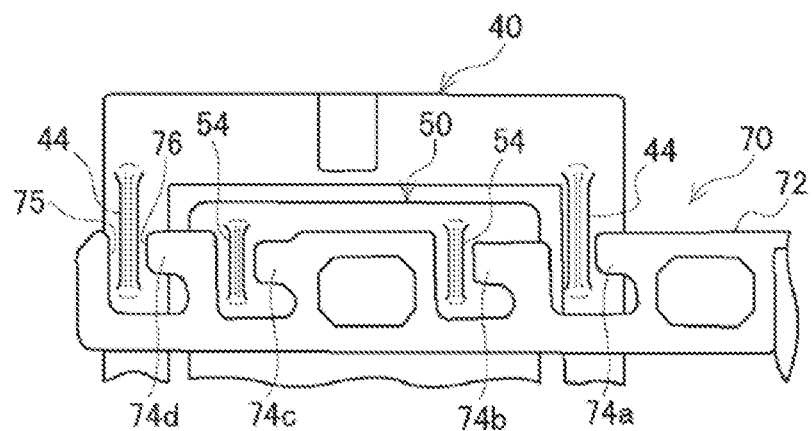
Figure 9C:
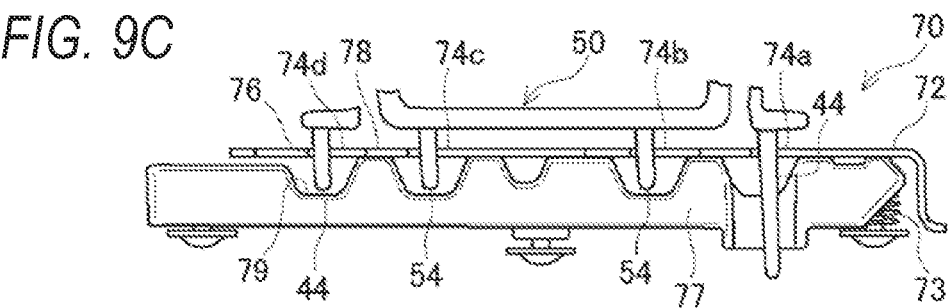
Figure 9D:
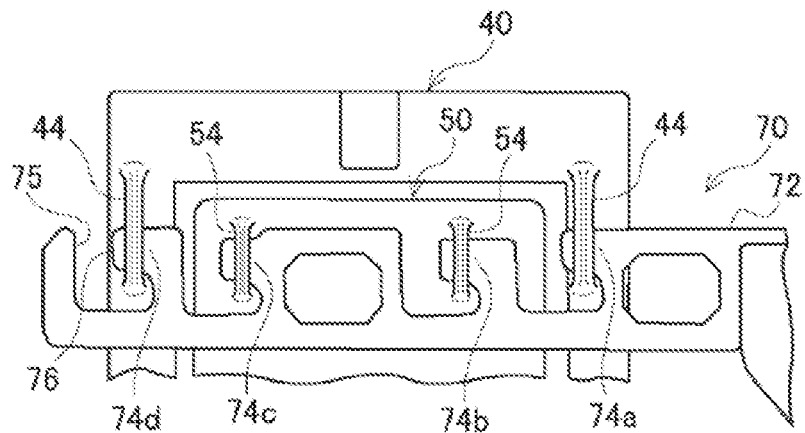

A locking operation of the locking mechanism will be described with reference to FIGS. 9A to 9D. FIGS. 9A to 9D are transition diagrams of the locking operation of the locking mechanism according to the present embodiment, where FIGS. 9A and 9B illustrate an unlocked state of the locking mechanism, and FIGS. 9C and 9D illustrate a locked state of the locking mechanism.

As illustrated in FIGS. 9A and 9B, in the unlocked state of the locking mechanism 70, the locking pieces 74a to 74d of the lock plate 72 come off the openings of the pair of latch receiving portions 54 and the pair of handle receiving portions 44. At this time, a plate support portion 77 is pressed against the lock plate 72 by a coil spring 73, and the lock plate 72 is supported by the plate support portion 77 from below. A plurality of concave portions 79 are formed in a side wall of the plate support portion 77 so as to escape from the pair of latch receiving portions 54 and the pair of handle receiving portions 44, and the plurality of convex portions 78 that support the lock plate 72 are formed between the plurality of concave portions 79.

Further, the lock plate 72 is cut out in an L shape in the plan view so that the pair of latch receiving portions 54 and the pair of handle receiving portions 44 can be hooked. Each notch 75 of the lock plate 72 is aligned with each concave portion 79 of the plate support portion 77, and the pair of latch receiving portions 54 and the pair of handle receiving portions 44 can enter the concave portions 79 through the notches 75. Further, the plurality of convex portions 78 of the plate support portion 77 are in contact with the locking pieces 74a to 74d of the lock plate 72, and a contact area of the plate support portion 77 with the lock plate 72 is minimized.

As illustrated in FIGS. 9C and 9D, when the lock plate 72 slides by a key operation, the locking pieces 74a to 74d are positioned above the plurality of concave portions 79 of the plate support portion 77. The locking pieces 74a to 74d enter the openings of the pair of latch receiving portions 54 and the pair of handle receiving portions 44, and the pair of latch receiving portions 54 and the pair of handle receiving portions 44 are hooked by the locking pieces 74a to 74d, so that the latch mechanism 50 and the handle 40 are locked. During this locking operation, since the contact area of the plate support portion 77 with the lock plate 72 is minimized, the sliding resistance to the lock plate 72 is reduced and the operability of the locking mechanism 70 is improved.

Further, during the locking operation, the plurality of convex portions 78 continue to be in contact with at least a part of the locking pieces 74a to 74d. An edge 76 is formed in the lock plate 72 by the notch 75, but since the locking pieces 74a to 74d do not completely come off from the plurality of convex portions 78, the convex portions 78 are not scraped by the edges 76. Therefore, even if the plate support portion 77 is pressed against the lock plate 72 by the coil spring 73, damage to the plate support portion 77 due to the slide of the lock plate 72 is prevented. In this way, the latch mechanism 50 and the handle 40 can be locked simultaneously with a simple configuration in which a single lock plate 72 is slid.

On the other hand, an unlocking operation of the locking mechanism 70 is performed in a reverse procedure of the locking operation. That is, when the lock plate 72 slides in a direction opposite to the locking operation by the key operation, the locking pieces 74a to 74d come off the openings of the pair of latch receiving portions 54 and the pair of handle receiving portions 44. Accordingly, the hooking of the pair of latch receiving portions 54 and the pair of handle receiving portions 44 by the locking pieces 74a to 74d is released, and the latch mechanism 50 and the handle 40 are unlocked. During the unlocking operation, since the plurality of convex portions 78 continue to be in contact with at least a part of the locking pieces 74a to 74d, the convex portions 78 are not scraped by the edges 76 of the lock plate 72.

Figure 10A:
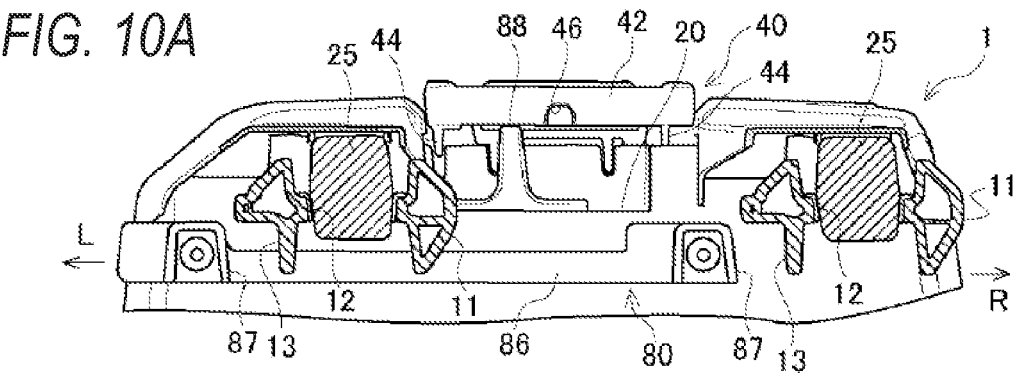
FIGS. 10A to 10D are transition diagrams of a fixing operation of the fixing mechanism according to the present embodiment.
Figure 10B:
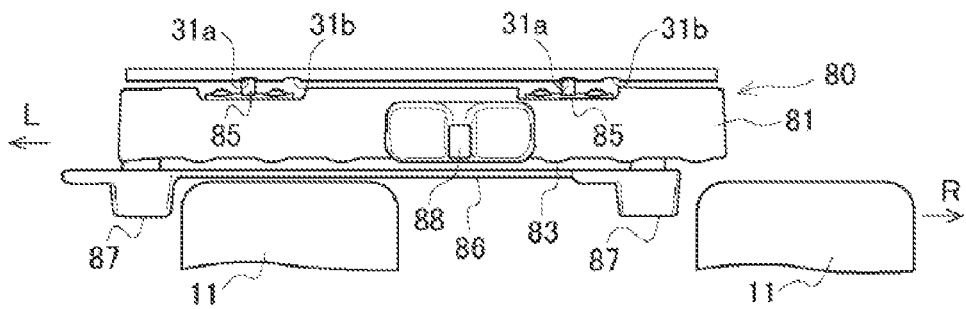
Figure 10C:
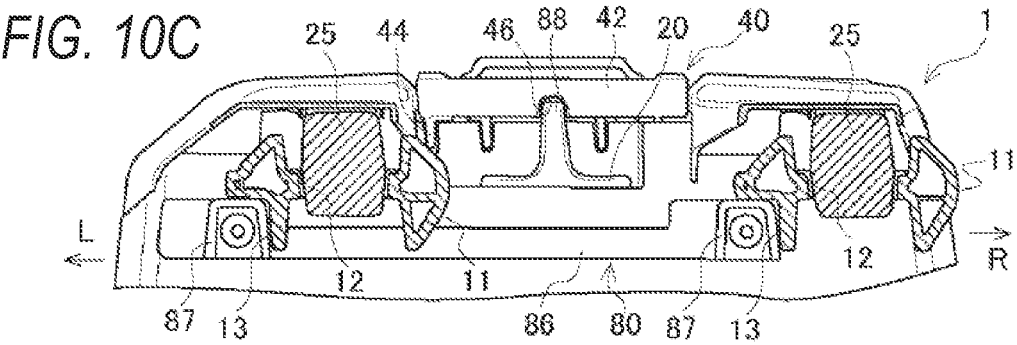
Figure 10D:
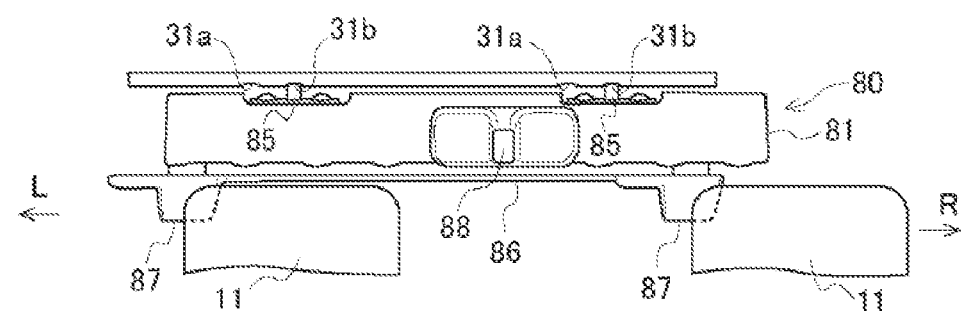

A fixing operation of the fixing mechanism will be described with reference to FIGS. 10A to 10D. FIGS. 10A to 10D are transition diagrams of the fixing operation of the fixing mechanism according to the present embodiment, where FIGS. 10A and 10B illustrate a released state of the locking mechanism, and FIGS. 10C and 10D illustrate a fixing state of the locking mechanism. Although FIGS. 10A and 10C illustrate a state in which the handle is downed, it is assumed that the knob portion is operated in a state in which the handle is upped.

As illustrated in FIG. 10A, the pair of locking portions 11 project from the case holder 10 (see FIG. 1), and the pair of fixing hooks 25 of the storage case 1 are hooked to the locking holes 12 of the locking portions 11. Locking recessed portions 13 into which the pair of support portions 87 of the slide hook 86 can enter are formed in the left-lower portions of the respective locking portions 11. When the slider 81 (see FIG. 10B) is positioned inside the case body 20, the slide hook 86 is positioned behind the case body 20 and the knob portion 88 is positioned above the case body 20. Since the knob portion 88 is located directly below the grip 42 of the handle 40, the knob portion 88 is operated in the state in which the handle 40 is raised.

As illustrated in FIGS. 10A and 10B, the slider 81 is positioned at the attachment/detachment position in the released state of the fixing mechanism 80. At this time, the pair of positioning protrusions 85 of the slider 81 are fitted in the pair of positioning recessed portion 31a, and the pair of support portions 87 of the slide hook 86 are separated from the locking recessed portions 13 of the pair of locking portions 11. When the storage case 1 is attached to or detached from the case holder 10, the pair of support portions 87 of the slide hook 86 do not interfere with the pair of locking portions 11 of the case holder 10. Therefore, when the slider 81 is positioned at the attachment/detachment position, the storage case 1 is attachable to and detachable from the case holder 10.

When the slider 81 is positioned at the attachment/ detachment position, the tip of the knob portion 88 comes off the recess 46 of the handle 40, and the handle 40 cannot be completely downed. Therefore, the pair of handle receiving portions 44 of the handle 40 hinder the sliding of the lock plate 72 (see FIGS. 9A to 9D). The latch mechanism 50 and the handle 40 are not locked by the locking mechanism 70 (see FIGS. 9A to 9D) in a state in which the storage case 1 is attachable to or detachable from the case holder 10. Since the handle 40 is downed due to interference with the tip of the knob portion 88, it can be confirmed that the hooked state of the storage case 1 to the case holder 10 is not fixed from a rising condition of the handle 40.

As illustrated in FIGS. 10C and 10D, the slider 81 is slid from the attachment/detachment position to the fixed position by the knob portion 88. At this time, the pair of positioning protrusions 85 of the slider 81 move from the pair of positioning recessed portions 31a to the pair of positioning recessed portions 31b, and the pair of support portions 87 of the slide hook 86 enter the locking recessed portions 13 of the pair of locking portions 11. When the pair of support portions 87 enter the pair of locking recessed portions 13, the pair of fixing hooks 25 are restricted from coming off the locking holes 12 of the pair of locking portions 11. Therefore, when the slider 81 is positioned at the fixed position, the storage case 1 is not attachable to or detachable from the case holder 10.

When the slider 81 is positioned at the fixed position, the tip of the knob portion 88 enters the recess 46 of the handle 40, and the handle 40 can be tilted. Therefore, the pair of handle receiving portions 44 of the handle 40 do not hinder the sliding of the lock plate 72 (see FIGS. 9A to 9D). The latch mechanism 50 (see FIGS. 9A to 9D) and the handle 40 are locked by the locking mechanism 70 (see FIGS. 9A to 9D) in the state in which the storage case 1 is not attachable to or detachable from the case holder 10. When the handle 40 is locked, the slider 81 is fixed at the fixed position by the recess 46 of the handle 40. That is, the fixing mechanism 80 is also locked in the state in which the slider 81 is positioned at the fixed position.

As described above, according to the present embodiment, the slider 81 is positioned at the fixed position by the latch mechanism 50 or the handle 40, and by locking the latch mechanism 50 and the handle 40, the fixing mechanism 80 is indirectly locked via the latch mechanism 50 or the handle 40. Therefore, locking is performed in the closed state of the storage case 1, and locking is performed in the state in which the storage case 1 is fixed to the vehicle, so that the operability of the locking operation is improved and the workload of the user is reduced. Further, since locking can be performed when the slider 81 is at the fixed position, the fixing mechanism 80 is not accidentally locked while the storage case 1 is attachable and detachable.

Further, in the present embodiment, although the latch arm is connected to the case body via the connecting arm, the latch arm may be directly connected to the case body, or may be connected to the case body via another link mechanism.

Further, in the present embodiment, the single latch arm is hooked to the arm receiving portion including the plurality of plate-shaped protrusions, but the number of the latch arms and the number of the arm receiving portions are not particularly limited. For example, a plurality of the latch arms may be hooked to the plurality of the arm receiving portions, or a single latch arm may be hooked to a single arm receiving portion.

Further, in the present embodiment, the handle is formed in the U shape in the plan view, but the shape of the handle can be changed as appropriate. The handle includes the support arms swinging about the swing shaft extending in the case width direction and the grip extending inward from the support arms in the case width direction, and is formed as long as a part of the latch mechanism is located on the inner side of the support arms in the case width direction when the handle is tilted. For example, the handle may be formed in an L shape in the plan view by one support arm and the grip.

Further, in this embodiment, the slider is positioned at the fixed position by the handle, but the slider may be positioned at the fixed position by the latch mechanism. For example, the slider may be positioned by forming the recess in the latch arm and inserting the tip of the knob portion into the recess of the latch arm.

Further, in this embodiment, the slider is positioned by inserting the knob portion into the recess of the handle, but a positioning structure of the slider by the handle is not particularly limited. For example, a recess for hooking a finger is formed on the slider, and a protrusion that enters the recess may be formed on the handle.

Further, in the present embodiment, storage cases are attached to left and right sides of the vehicle, but the storage cases may be attached to front and rear sides of the vehicle. Although the case body of the storage case is attached to the case holder, the case cover of the storage case may be attached to the case holder.

Further, in the present embodiment, storage cases are attached to the vehicle which is the attachment target, but the storage cases may be attached to an attachment target other than the vehicle.

As described above, a storage case 1 according to the present embodiment is a storage case in which a case cover 30 is openably and closably connected to a case body 20, and includes a latch mechanism 50 configured to fix the case cover to the case body; a handle 40 swingably connected to a plane to which the latch mechanism is connected; a locking mechanism 70 configured to lock the latch mechanism and the handle simultaneously; and a fixing mechanism 80 configured to fix a hooked state of the storage case to locking portions 11 of an attachment target (a vehicle), in which the fixing mechanism includes a movable member (a slider 81) that is movable to an attachment/detachment position where the storage case is attachable and detachable and a fixed position where the storage case is not attachable or detachable, the movable member is capable of being positioned at the fixed position by the latch mechanism or the handle, and the locking mechanism is capable of performing locking when the movable member is positioned at the fixed position. According to this configuration, the movable member is positioned at the fixed position by the latch mechanism or the handle, and by locking the latch mechanism and the handle, the fixing mechanism is indirectly locked via the latch mechanism or the handle. Therefore, locking is performed in the closed state of the storage case 1, and locking is performed in the state in which the storage case is fixed to the attachment target, so that the operability of a locking operation is improved and a workload of a user is reduced. Further, since locking can be performed when the movable member is at the fixed position, the fixing mechanism is not accidentally locked while the storage case is attachable and detachable.

In the storage case according to the present embodiment, the movable member can be positioned at the fixed position by the handle. According to this configuration, the movable member is positioned by the handle, and by locking the handle, the movable member is indirectly locked via the handle. Since the handle is not locked when the movable member is not positioned by the handle, it is possible to confirm whether the storage case is fixed in the hooked state by the handle which is easily noticeable. In the storage case according to the present embodiment, the fixing mechanism includes a hook member (a slide hook 86) configured to slide integrally with the movable member, and the hook member fixes the hooked state of the storage case to the locking portions when the movable member moves to the fixed position. According to this configuration, the hooked state to the locking portions of the attachment target can be fixed by the fixing mechanism having a simple configuration.

In the storage case according to the present embodiment, the fixing mechanism includes a knob portion 88 configured to operate the movable member, the handle is formed with a recess 46 which the knob portion enters, and when the knob portion enters the recess, the movable member is positioned at the fixed position by the handle. According to this configuration, the movable member can be positioned at the fixed position by the knob portion of the movable member and the recess of the handle.

In the storage case according to the present embodiment, the storage case is formed with eaves portions 28 covering a portion to be hooked to the locking portions of the attachment target. According to this configuration, the portion to be hooked is covered with the eaves portions so that the hooking portion is not exposed to the outside, the appearance is simplified, and the design is improved.

Although the present embodiment has been described, the above-described embodiment and the modification may be combined in whole or in part as another embodiment.

The technique of the present invention is not limited to the above-described embodiment, and various changes, substitutions, and modifications may be made without departing from the spirit of the technical idea of the present invention. Further, the present invention may be implemented using other methods as long as the technical concepts can be implemented by the methods through advance of the technology or other derivative technology. Accordingly, the claims cover all embodiments that may be included within the scope of the technical concepts.

What is claimed is:

1. A storage case in which a case cover is openably and closably connected to a case body, the storage case comprising:
   a latch mechanism configured to fix the case cover to the case body, the latch mechanism being connected to a plane of the case body;
   a handle swingably connected to the same plane as the plane to which the latch mechanism is connected;
   a locking mechanism configured to lock the latch mechanism and the handle simultaneously; and
   a fixing mechanism configured to fix a hooked state of the storage case to a locking portion of an attachment target,
   wherein the fixing mechanism includes a movable member that is movable to an attachment/detachment position where the storage case is attachable and detachable and a fixed position where the storage case is not attachable or detachable,
   wherein the latch mechanism or the handle is capable of positioning the movable member at the fixed position, and
   wherein the locking mechanism is capable of performing locking in a state in which the movable member is positioned at the fixed position.

2. The storage case according to claim 1,
   wherein the movable member is capable of being positioned at the fixed position by the handle.

3. The storage case according to claim 2,
   wherein the fixing mechanism includes a hook member configured to slide integrally with the movable member, and
   wherein the hook member fixes the hooked state of the storage case to the locking portion when the movable member moves to the fixed position.

4. The storage case according to claim 3,
   wherein the fixing mechanism includes a knob portion configured to operate the movable member, wherein the handle is formed with a recess which the knob portion enters, and wherein when the knob portion enters the recess, the movable member is positioned at the fixed position by the handle.

5. The storage case according to claim 1, wherein the storage case is formed with an eaves portion covering a portion to be hooked to the locking portion of the attachment target.

* * * * *